United States Patent [19]
Ennis

[11] 3,720,972
[45] March 20, 1973

[54] VEHICLE WRAP-AROUND CLEANING APPARATUS

[76] Inventor: George Thomas Ennis, 1354 East State Street, Sharon, Pa.

[22] Filed: Sept. 7, 1971

[21] Appl. No.: 178,191

[52] U.S. Cl. .............................. 15/21 D, 15/DIG. 2
[51] Int. Cl. ............................................. B60s 3/06
[58] Field of Search ........... 15/DIG. 2, 21 D, 21 E, 53

[56] References Cited

UNITED STATES PATENTS

| 3,428,982 | 2/1969 | Beer | 15/21 D |
| 3,624,851 | 12/1971 | Barber | 15/21 D |

*Primary Examiner*—Edward L. Roberts
*Attorney*—Harold J. Birch et al.

[57] ABSTRACT

A vehicle wrap-around rotary brush-type cleaning assembly having a first arm pivotally mounted at one side of the path of a vehicle and a second arm pivoted thereto carrying rotatable brush means at one end. Spring tensioning means connect the first arm to the frame and the second arm to the first arm to maintain the arms in a normal open position. A compression spring is positioned between the two arms to limit relative movement in one direction and urge the arms back to their normal position. A damping cylinder connected between the arms by a pin and slotted plate connection permits relative initial movement between the arms prior to any damping taking effect. The brush moves across the front, along the side and across the back of a vehicle. Two brush assemblies may be disposed directly opposite each other on each side of the path with the brushes in overlapping relation to clean both sides of a vehicle.

9 Claims, 11 Drawing Figures

PATENTED MAR 20 1973

INVENTOR
GEORGE THOMAS ENNIS

BY Birch, Swindler, McKie & Beckett

ATTORNEYS.

VEHICLE WRAP-AROUND CLEANING APPARATUS

BACKGROUND OF THE INVENTION

1. Field of the Invention

This invention relates generally to vehicle washing apparatus and, more particularly, to a vehicle washing apparatus employing one or more wrap-around rotating brush-type assemblies for automatically cleaning the front, sides and back of a vehicle.

2. Description of the Prior Art

Numerous devices have been available for washing vehicles in the past employing wrap-around type rotary brush assemblies for cleaning the front, sides and back of a vehicle such as a car. Many such prior art devices, however, have been objectionable in that they have been complicated in construction, requiring the use of extensive power central means to effect a proper movement of the brush supporting arms to effectively clean the vehicle. Such devices have often required close supervision and extensive maintenance and adjustment. Consequently, such devices have been expensive to construct, operate and maintain.

Other such devices have employed brushes supported by arms which pass overhead of a vehicle being washed, thus creating the possibility of damage to a vehicle. Furthermore, other such prior known devices have not operated to satisfactorily clean the vehicle. The brushes of still other prior art cleaning devices have had a tendency to snag on a vehicle, thus causing damage thereto.

SUMMARY OF THE INVENTION

Among the objects of the present invention is to avoid the disadvantages of prior art vehicle washing devices enumerated above. Another object of the present invention is to provide a vehicle washing apparatus which is simple in construction, thus providing an extremely compact, inexpensive and efficient unit. Still another object is to provide a vehicle washing apparatus employing a wrap-around type brush assembly whose arms are primarily controlled by tension and compression spring means. A further object of the invention is to provide vehicle washing apparatus which effectively cleans the front, sides and back of the vehicle.

According to the present invention, there is provided a vehicle washing apparatus in which a brush assembly is supported in the path of a vehicle by mounting means attached to a framework at the side of the path of the vehicle whereby a car passing along the path engages a rotary brush which travels across the front, along the side and across the back of a vehicle. The brush is rotated in a direction whereby the reaction force of the brush against the vehicle causes the brush to move itself around the vehicle.

In a specific embodiment of the invention, a first arm is pivotally mounted at one end to frame means outside the path of the vehicle. A second arm, pivotally connected to the opposite end of the first arm, supports a rotatable brush in the path of the vehicle. Spring tensioning means are provided between the first arm and the frame means and the first arm and the second arm to normally maintain the arms in an open position whereby the second arm is generally transversely of the path of the vehicle. Compression spring means positioned between the outer end of the second arm and the first arm limit the relative movement between the arms in one direction and urge the second arm back towards its normal open position with respect to the first arm after the second arm has been moved out of its normal position through initial contact of the brush means by a vehicle moving along the path. A damping cylinder is connected between the two arms by means including a plate having an elongated slot therein whereby the second arm is free to move a distance corresponding to the length of the slot prior to the damping cylinder taking effect. The device further includes means for adjusting the position of one end of each of the tension springs to vary the tension thereof. Two such brush assemblies as just described may be disposed directly opposite each other on each side of the path of the vehicle whereby the brushes are initially in overlapping relation to insure complete washing of the front, both sides and the back of the vehicle.

BRIEF DESCRIPTION OF THE DRAWINGS

Other objects and advantages of the invention will become apparent by reference to the more detailed description of the invention and the accompanying drawings which follow, wherein.

DESCRIPTION OF THE INVENTION

Figure 1:
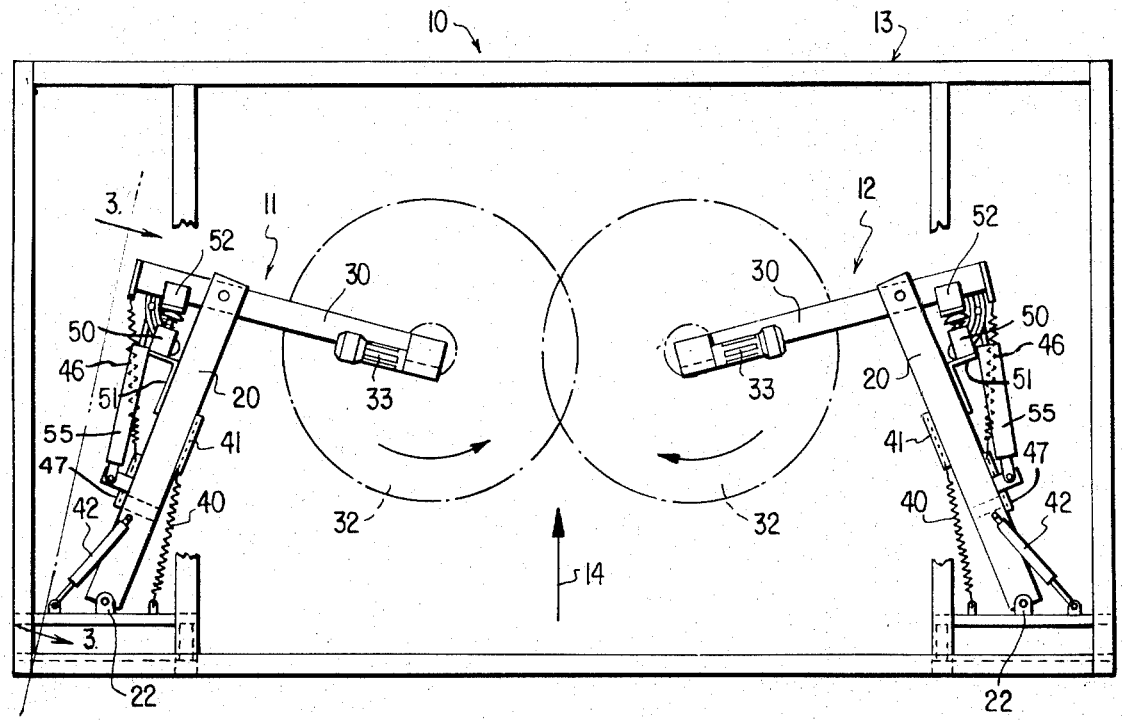
FIG. 1 is a top plan view of a vehicle washing device according to the invention, showing two brush assemblies disposed directly opposite each other on each side of the path of a vehicle to be washed.
Figure 2:
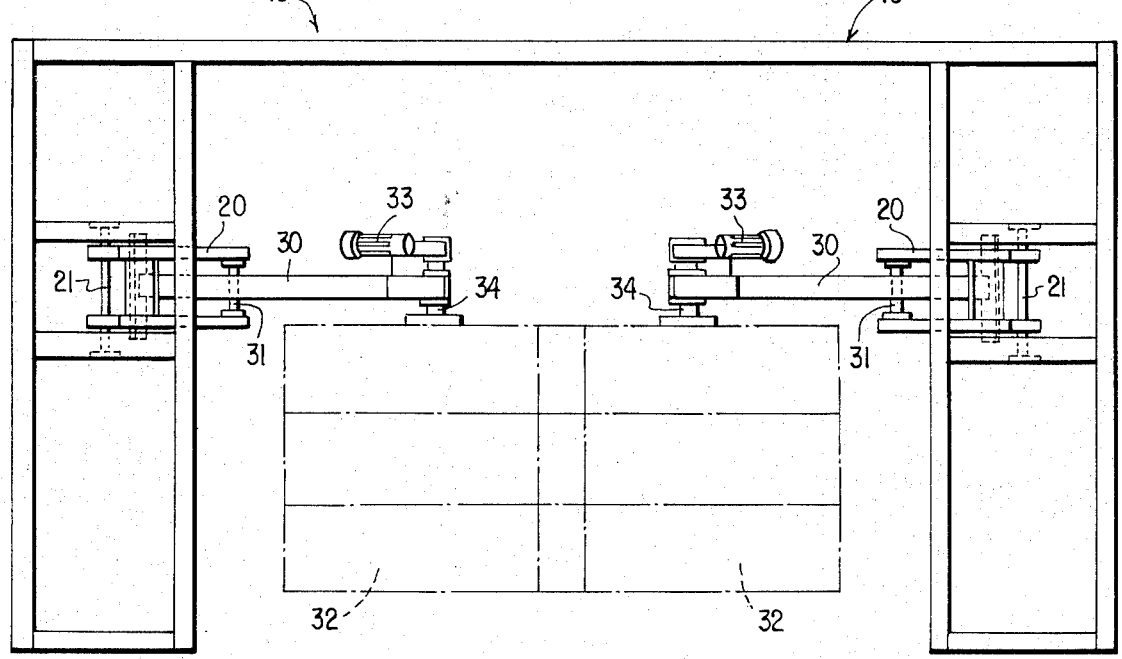
FIG. 2 is a front end elevation view of the vehicle washing device shown in FIG. 1.

Referring to the drawings, there is shown a vehicle washing apparatus 10 according to the present invention, comprised of a pair of brushing units 11 and 12 mounted on suitable supporting frame means generally indicated by the numeral 13. The frame means 13 includes suitable side frame members and top members extending over a predetermined path, generally indicated by the arrow 14, of a vehicle to be washed. The brush assemblies 11 and 12 are disposed directly opposite each other on each side of the path 14.

Figure 3:
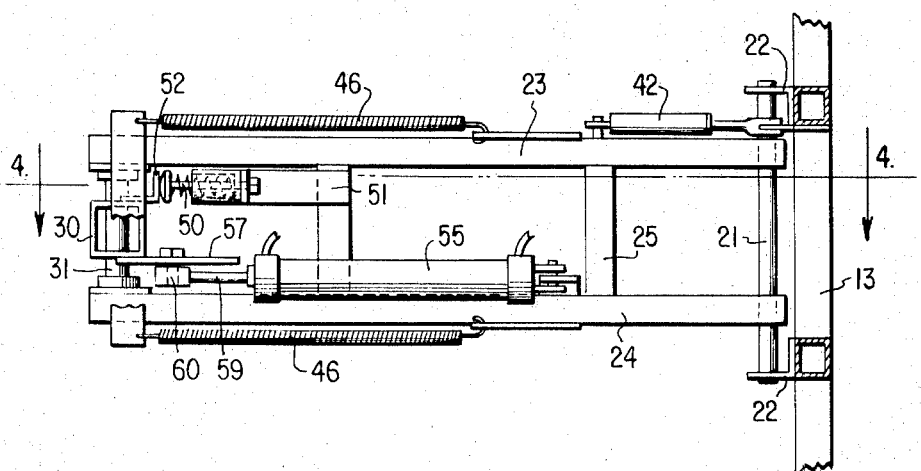
FIG. 3 is an end elevational view of the arms of one of the brush assemblies taken along line 3.3 of FIG. 1.

Each of the brush assemblies 11 and 12 is comprised of a first arm 20, pivotally mounted at its outer end to a pivot rod 21 attached to the side of the frame means 13 by suitable bracket means 22. Arm 20 is comprised of an upper beam 23 and a lower beam 24 connected together by intermediate beams 25, as best shown in FIG. 3. In its normal open position, arm 20 extends forwardly along and generally parallel to the path 14 of the vehicle.

A second arm 30 is pivotally attached to the opposite outside end of the first arm 20 by a suitable pivot rod 31. The pivotal connection between the first arm 20 and the second arm 30 is located at a point intermediate the ends of second arm 30, as shown in FIG. 1. In its normal open position, arm 30 extends generally transversely of the path 14 from a point at the side of the path to a point intermediate of the path.

A rotary brush 32 is attached to the inner end of arm 30 and depends downwardly therefrom for rotational movement about shaft 34 constituting a vertical axis. Suitable motor means 33 are mounted on top of the inner end of arm 30 to rotate the brush 32, which preferably is of the type having soft bristles which collapse when the brush is not rotating but which expand outwardly during rotation.

As shown in FIG. 1, the rotary brushes 32 of the brush assemblies 11 and 12, in their normal position prior to contact by a vehicle, are positioned generally in the center of the path in overlapping relation to insure that the center of the front of the vehicle is adequately washed. The brushes 32 of the brush assemblies 11 and 12 are rotated in opposite directions as shown by the arrows in FIG. 1, whereby the force of the brush against the vehicle causes the brush 32 of brush assembly 11 to move to the left across the front of the vehicle, around the corner, back along the side, and right across the back of the vehicle, while the brush 32 of brush assembly 12 moves to the right across the front of the vehicle, back along the right side and left across the back of the vehicle as the vehicle is moved forwardly along the path. During the cleaning operation the vehicle 35 may be advanced through the vehicle washing apparatus in the direction of arrow 14 by means of any conventional conveying device installed at the bottom or base of the apparatus for connection to the vehicle. A conveying device is not illustrated in the drawings since any well-known and conventional conveying apparatus may be employed. Alternatively a guide rail system may be installed whereby the vehicle may be driven through under its own power.

A first tension spring means 40 normally maintains each arm 20 in an open position whereby the arm extends forwardly generally parallel to the path of the vehicle. Spring means 40 is attached at its inner end to the frame 12 and in the outer end to a suitable opening in a bracket 41 attached to a point intermediate the ends of the arm 20 on the inside thereof. Bracket 41 is provided with a plurality of openings to permit the tension of the spring to be varied by attaching the outer end thereof to one of the openings. If desired, two such tension springs 40 may be employed positioned at the top and the bottom of the arm 20. A suitable shock absorber 42 is attached at one end to the frame means 13 and at its other end to the arm 20 to further regulate and control the movement of the arm 20. If desired, two such shock absorbers may be employed attached to the bottom and the top of the arm 20.

A second tension spring means 46 is attached at its inner end to a bracket 47 mounted on the outside of each arm 20 and at its outer end to the outer end of arm 20 extending beyond the point at which the two arms are pivotally connected. Bracket 47 also is provided with a plurality of openings to permit an adjustment of the tension of spring means 46 by attaching the spring to one of the various openings. Spring means 46 normally maintains arm 30 in an open position extending generally transversely of the path 14 and generally perpendicular to arm 20 whereby the included angle between the two arms is approximately 90°.

Figure 5A:
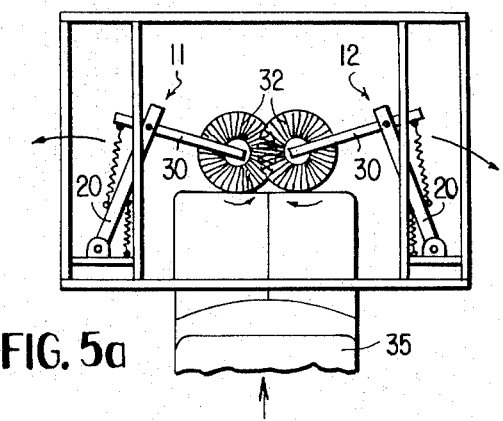
FIGS. 5a through 5g are schematic top plan views of the vehicle washing device of FIG. 1, illustrating the various positions of the brushes as a vehicle is being washed during its passage through the device.

A compression spring means 50 is mounted on a bracket 51 attached to each arm 20 at a point on the outside thereof adjacent the pivotal connection between the two arms 20 and 30. An abutment means 52 is attached to the inside of arm 30 at a point outside the pivotal connection to arm 20 whereby the abutment means 52 contacts the end of compression spring 50 when arm 30 is pivoted forwardly and outwardly with respect to arm 20. Thus compression spring 50 not only tends to limit the relative movement between the arms in one direction but also urges the second arm 30 back towards its normal position with respect to arm 20 after arm 30 has been moved outwardly away from its normal position through initial contact with a vehicle. This arrangement is highly advantageous in that it facilitates the knuckling or bending of the two arms with respect to each other as the brush rounds the front corner of the vehicle and begins its movement down along the side as shown in FIG. 5b. For this purpose, it is to be noted that the compression spring has a greater force than tension spring 46. Moreover, upon initial contact with a vehicle, the compression spring functions to hold the brush on the front end of the vehicle for a longer period of time since it operates to initially inhibit relative pivotal movement between the arms 20 and 30. Thus, as shown in FIGS. 5a and 5b, the arms 20 and 30, as the brushes 32 move across the front of the vehicle, tend to maintain their normal position approximately perpendicular to each other. It is further apparent that by use of this arrangement during the initial washing of the front of the vehicle, essentially only the first arm 30 pivots outwardly while the two arms together generally maintain their same relative normal position to provide a more effective washing and brushing of the vehicle.

Figure 4:
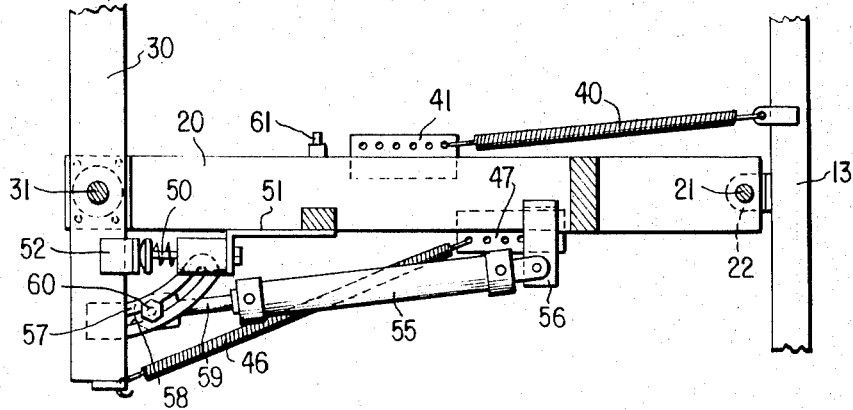
FIG. 4 is a view taken along line 4.4 of FIG. 3.

A hydraulic arm control damping cylinder 55 is pivotally attached at one end to a bracket 56 mounted on the outside of arm 20 and at the other end to a slotted plate 57 attached to the outer end of arm 30, as best shown in FIGS. 3 and 4. Preferably plate 57 is provided with a curved slot 58. The rod 59 of cylinder 55 is attached for movement in slot 58 by means of a suitable bolt connection 60. The hydraulic cylinder provides a further means for evenly controlling the relative movement between the two arms 20 and 30 during the washing cycle. The curved slot is particularly advantageous in that, as the brush 32 rounds the front corner of the vehicle, as shown in FIG. 5b, the bolt 60 is permitted to move the length of the slot prior to the cylinder 55 taking effect. This has the result of not restricting the knuckling movement of the arms as the brush begins its movement back along the side of the vehicle. As the arms 20 and 30 continue to knuckle to closed position, as shown in FIG. 5d, the bolt reaches the end of the slot and the damping cylinder then becomes effective to provide an even, controlled movement between the two arms to increase the washing efficiency of the brush. Conversely, as the brush 32 rounds the back corner of the vehicle, as shown in FIG. 5f, the bolt again is permitted to move the length of the slot in an opposite direction to facilitate initial movement of the brush back across the end of the vehicle without restriction from the damping cylinder. As the end of the slot is reached, the damping cylinder again becomes effective to provide even, controlled movement of the arms to again increase the ability of the brush to wash the back of the vehicle.

Figure 5E:
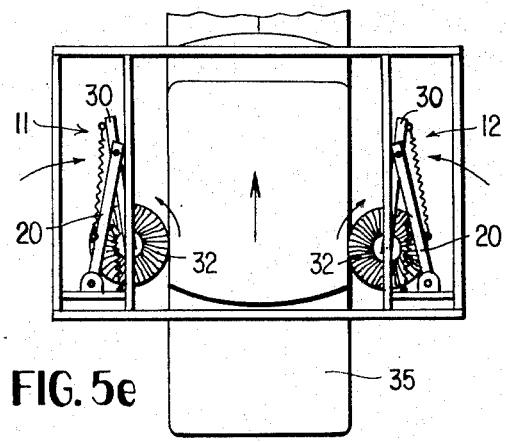
Figure 5B:
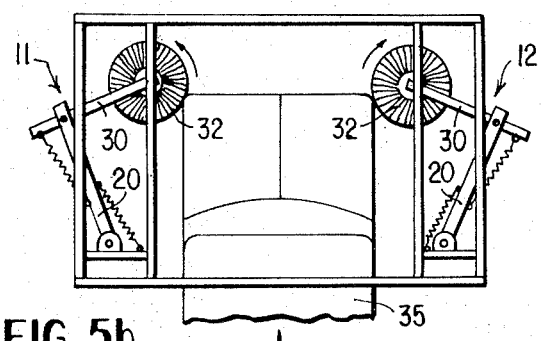
Figure 5F:
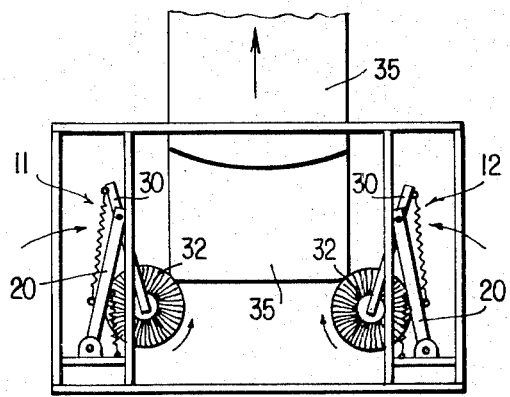

As shown in FIG. 4, a knuckling arm bumper 61 is mounted on the inside of arm 20 to function as a stop means when the arms 20 and 30 are in a completely knuckled position, as shown in FIG. 5e.

The operation of the vehicle washing apparatus of the present invention is best understood by reference to FIGS. 5a through g. Beginning with FIG. 5a, the arms 20 and 30 of the brush assemblies 11 and 12 are in their normal open position whereby the arms 30 extend primarily transversely of the path 14 of the vehicle 35 to position the brushes 32 centrally of the path in overlapping relation. As the vehicle 35 contacts the brushes 32, the rotative force of the brushes in the direction of the arrows causes the brushes to move in opposite directions across the front towards the outside corners of the vehicle. As the brushes move across the front of the vehicle, the various compression and tension spring connections cause the arms 20 and 30 to maintain their same generally perpendicular relative positions to provide increased brushing action on the front of the vehicle.

Figure 5C:
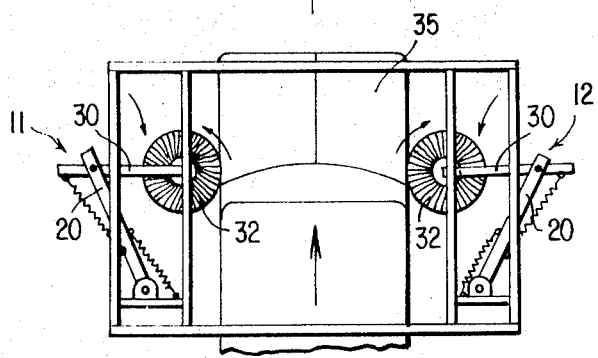

Referring to FIG. 5b, as the brushes 32 round the corner of the vehicle, the arms 20 and 30 then begin to knuckle towards a closed position, as shown in FIG. 5c. It is to be noted that the force of the rotating brush against the vehicle is greater than the force of the tension springs to cause the arms to knuckle against the force of the springs.

As shown in FIG. 5b, at the time the brushes reach the corners of the vehicle, the arms 20 have moved to approximately their maximum position towards the side of the vehicle washing apparatus. As the vehicle continues to move through the apparatus, the arms 30 then continue to knuckle towards arms 20 as the sides of the vehicle are washed until a point is reached approximately midway of the vehicle, as shown in FIG. 5d. From this point on, arms 20 then begin to pivot inwardly towards the sides of the vehicle, as shown in FIG. 5e, until the arms 20 and 30 are in the completely closed position shown in FIG. 5e. This knuckling action insures that the tension springs urging the arms back towards their normal position keep the brush against the sides of the vehicle with sufficient force to provide an effective brushing and cleaning action.

Figure 5G:
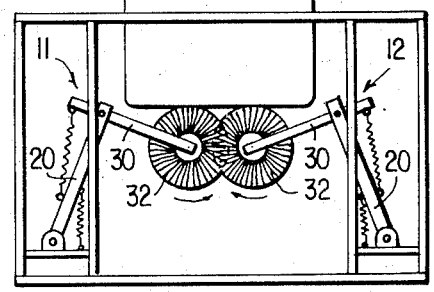
Figure 5D:
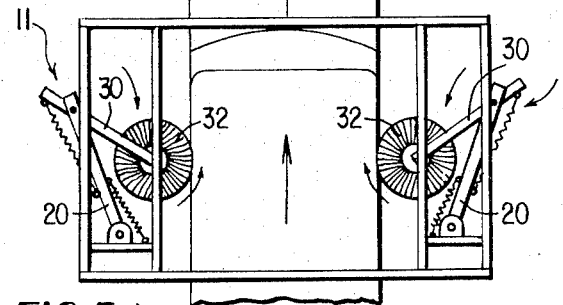

As the vehicle continues further through the washing apparatus, the brushes 32 reach the rear corners of the vehicle and begin their movement across the back thereof, as shown in FIG. 5f. As the brushes move across the back of the vehicle, the arms 20 return to their normal position and arms 30 continue to unknuckle and move forwardly in the direction of movement of the vehicle to insure an effective cleaning of the back of the vehicle. Finally, as shown in FIG. 5g, the brushes return to their normal overlapping relation to insure an effective cleaning of the entire back end of the vehicle.

The advantages of the present invention are readily apparent from the description above. The use of tension and compression springs along with the arm control cylinder permit the construction of a simple vehicle washing apparatus which is not only economical but which may be incorporated into an extremely compact and small unit. An effective cleaning action is provided without resort to complicated control mechanisms to operate the brushes. Such a simple and compact unit is easy to operate and requires a minimum of supervision and maintenance. Moreover, during the washing cycle none of the supporting arms pass over the top of the vehicle.

Although the present invention has been illustrated and described with reference to a specific embodiment, it will be understood that various modifications may be made by persons skilled in the art without departing from the spirit of the invention which is defined solely by the appended claims.

I claim:

1. A vehicle washing apparatus comprising
   a. supporting frame means along a predetermined path of a vehicle to be washed,
   b. a first arm pivotally mounted at one end to said frame means at a point outside the path of the vehicle,
   c. a second arm pivotally connected adjacent one end to the opposite end of said first arm,
   d. rotatable brush means mounted at the opposite end of said second arm, said brush means being adapted to move across the front, along the side and across the back of a vehicle,
   e. a first tension means connected to said first arm and said frame means to normally maintain said first arm in a position extending generally along said path at one side thereof,
   f. a second tension means connected to said first arm and said second arm to normally maintain said second arm in a position extending generally transversely of said path whereby said brush means is in a position to be contacted by a vehicle moving along said path,
   g. and compression bearing means positioned between said one end of said second arm and said first arm to limit the relative movement between said arms in one direction and to urge said second arm back towards its normal position with respect to said first arm after said second arm has been moved out of its normal position through initial contact of said brush means by a vehicle moving along said path.

2. A vehicle washing apparatus according to claim 1 wherein said first and second tensioning means comprise tension springs.

3. A vehicle washing apparatus according to claim 2 which includes means for adjusting the tension of each of said first and second tension springs.

4. A vehicle washing apparatus according to claim 1 wherein said compression biasing means comprises a compression spring attached to one of said arms.

5. A vehicle washing apparatus according to claim 1 which includes a damping cylinder connected between said first arm and said second arm.

6. A vehicle washing apparatus according to claim 5 which includes a plate having an elongated slot therein mounted on one of said arms and means connecting one end of said cylinder to said slot to permit said second arm to move a distance corresponding to the length of said slot prior to said damping cylinder taking effect.

7. A vehicle washing apparatus according to claim 1 wherein said arms when in their normal position prior to contact with a vehicle are in generally perpendicular relation with respect to each other.

8. A vehicle washing apparatus comprising
   a. a supporting frame means extending along each side of a predetermined path of a vehicle to be washed,
   b. a pair or rotary brush assemblies disposed directly opposite each other along said path,
   c. each said brush assembly including a first arm pivotally mounted at one end to said frame means at a point outside said path,
   d. a second arm pivotally connected adjacent one end to the opposite end of said first arm,
   e. rotatable brush means mounted at the opposite end of said second arm, said brush means being adapted to move across the front, along the side and across the back of a vehicle,
   f. a first tension means connected to said first arm and said frame means to normally maintain said first arm in a position extending generally along said path at one side thereof,
   g. a second tension means connected to said first arm and said second arm to normally maintain said second arm in a position extending generally transversely of said path whereby said brush means is in a position to be contacted by a vehicle moving along said path,
   h. and compression bearing means positioned between said one end of said second arm and said first arm to limit the relative movement between said arms in one direction and to urge said second arm back towards its normal position with respect to said first arm after said second arm has been moved out of its normal position through initial contact of said brush means by a vehicle moving along said path.

9. A vehicle washing apparatus according to claim 8 wherein said brush means are normally in overlapping relation with respect to each other prior to being contacted by a vehicle moving along said path.

* * * * *